United States Patent [19]

Plöckl

[11] 3,970,825
[45] July 20, 1976

[54] APPARATUS AND A METHOD FOR READING LIGHT-DARK OR COLOR-CONTRAST CODES ON ARTICLES

[75] Inventor: Johann Plöckl, Unterhaching, Germany

[73] Assignee: Erwin Sick Optik-Elektronik, Germany

[22] Filed: Oct. 3, 1974

[21] Appl. No.: 511,703

[30] Foreign Application Priority Data
  Oct. 6, 1973  Germany............................ 2350278
  Apr. 25, 1974  Germany............................ 2419935

[52] U.S. Cl. ........................... 235/61.11 E; 250/555
[51] Int. Cl.² ..................... G06K 7/10; G08C 9/06
[58] Field of Search ................. 235/61.11 E, 61.7 B; 250/555, 566

[56] References Cited
UNITED STATES PATENTS

| | | | |
|---|---|---|---|
| 3,728,677 | 4/1973 | Munson........................ | 235/61.11 E |
| 3,812,374 | 5/1974 | Tuhro........................... | 235/61.11 E |
| 3,818,444 | 6/1974 | Connell........................ | 235/61.11 E |

*Primary Examiner*—Daryl W. Cook
*Attorney, Agent, or Firm*—Cushman, Darby & Cushman

[57] ABSTRACT

Apparatus and method for reading light-dark or color-contrast codes on articles which are displaced over a light-transmitting region of a support of the kind wherein a scanning light beam is directed onto the articles and scattered light reflected from the articles and codes is supplied to a photoelectric transducer the output signal from which is supplied to electronic evaluating means, wherein the scanning light beam is directed upwardly through the light-transmitting region of the support and is displaced along two imaginary straight lines located in the light-transmitting region of the support, said lines, which preferably intersect, extending obliquely to the direction of displacement of the articles and substantially at right angles to one another.

17 Claims, 8 Drawing Figures

APPARATUS AND A METHOD FOR READING LIGHT-DARK OR COLOUR-CONTRAST CODES ON ARTICLES

This invention relates to a method of and apparatus for reading light-dark or colour-contrast codes on articles which are displaced over a light-transmitting region of a support for the articles, of the kind wherein a scanning light beam is directed onto the articles and the scattered light reflected from the articles and code is supplied to a photoelectric transducer the output signal from which is supplied to electronic evaluating means.

With known methods and apparatus of this kind, the light-transmitting region of the support must be of considerable width to ensure that the scanning beam scans the whole extent of the code.

The present invention provides a method of reading light-dark or colour-contrast codes on articles which are displaced over a light-transmitting region of a support for the articles, wherein a scanning light beam is directed onto the articles and scattered light reflected from the articles and codes is supplied to a photoelectric transducer the output signal from which is supplied to electronic evaluating means, which comprises guiding at least one slender scanning light beam from beneath the support upwardly through the light-transmitting region of the support and displacing the scanning beam along two imaginary straight lines located in the light-transmitting region of the support, said lines extending obliquely to the direction of displacement of the articles and substantially at right angles to one another. This method makes it possible to use a support the light-transmitting region of which comprises narrow slits which coincide with said imaginary straight lines and through which the scanning beam can pass. Because the scanning beam is displaced along said two imaginary straight lines, it will always be in a position to sweep over the whole code at least once in its read-out direction and so read the code reliably.

Preferably said imaginary straight lines intersect. This ensures that the codes will be properly read even if the article carrying the code turns during the reading of the code. Such a method is sufficient when articles which are provided with a code are always positioned by an operator on the support in such a manner that that surface of each article bearing the code is placed on the support.

In the case of articles such as cylindrical food cans, it is advantageous to print the code with the label. The code thus appears on the cylindrical surface of the can, preferably at a plurality of positions around the periphery of the can. Such a code cannot be read with the hitherto known methods and apparatus if the can is stood on end on the support. On the other hand, if the can is placed with its cylindrical surface on the support then a faulty reading may result if the can rolls. Considerable additional expense is involved if separate stick-on labels with a code imprint have to be applied to at least one end of the cans. With these considerations in mind the scanning beam may be guided through the support obliquely relative to the support. Thus the scanning beam may travel obliquely towards the articles displaced over the support.

Preferably the scanning beam is displaced in imaginary planes which intersect the support at an angle of substantially 45°. With the bar codes usual today, it is always possible to read a code if the scanning beam is displaced transversely to the bars of the code, with an angle between the longitudinal direction of the bars and the scanning direction which amounts to at least 45°. Thus such an arrangement enables codes both on the undersurfaces of articles displaced over the support and on those surfaces of the articles normal to the support to be read.

A code on an article displaced along the support can accordingly be read by the method of the present invention regardless of its orientation because at least one scanning beam is reciprocated along said two imaginary straight lines which extend obliquely to the direction of movement and substantially at right angles to one another, so ensuring that the code will always be scanned correctly at least once. The same applies to codes which are applied to vertical surfaces of the articles. Here the scanning beam, which extends obliquely upwards and which is displaced along said imaginary straight lines, will sweep completely over the code at least once in a suitable direction.

The method according to the invention is suitable not only for the scanning of codes which are on cylindrical cans but also for codes on parallelepiped articles and articles of other shapes. The codes merely have to be applied always to a surface of the article which is at an angle of from 0° to 90° with the support.

Whereas in principle it is possible to scan the coded articles either from in front or from behind while they are travelling over the light-transmitting region of the support, in an advantageous further development this is effected from in front. An operator who is pulling the articles towards him over the light-transmitting region of the support then observes the articles in precisely the same way as the scanning beam and can therefore check whether a code thereon comes within the field of the scanning beam in each case. Also, the operator then does not have to look into the scanning beam, which might be unpleasant if, for example, a laser is used to produce the scanning beam.

While it is possible, in principle, to guide two different scanning beams along the two imaginary straight lines it is preferred that a single scanning beam be displaced successively along each of the two imaginary straight lines. This prevents, for example, two codes on the same article from being read by two scanning beams with phase displacement which could lead to difficulties and greater technical expenditure in the evaluation.

The invention also provides apparatus for reading light-dark or colour contrast codes on articles which are displaced over a light-transmitting region of a support for the articles of the kind wherein a scanning light beam is directed onto the articles and scattered light reflected from the articles and codes is supplied to a photoelectric transducer the output signal from which is supplied to electronic evaluating means, comprising means located beneath the support for producing at least one slender scanning beam of light and means for guiding said scanning bean upwardly through the light-transmitting region of the support and displacing it along two imaginary straight lines located in the light-transmitting region of the support, said lines extending obliquely to the direction of displacement of the articles and substantially at right angles to one another.

Preferably the means for guiding said scanning beam upwardly through the light-transmitting region of the support and displacing it along said two imaginary straight lines comprises means for fanning-out the scanning beam and means for deflecting the fanned-out scanning beam upwardly through the light-transmitting region of the support.

Advantageously the means for guiding said scanning beam upwardly through the light-transmitting region of the support and displacing it comprise said two imaginary straight lines is adapted to displace the fanned-out scanning beam along two imaginary straight lines which intersect.

The scanning beam producing means may be adapted to produce a single scanning beam and said deflecting means may comprises first reflecting means having a planar reflecting surface arranged parallel with one of said imaginary straight lines and obliquely to the said support for deflecting the fanned-out scanning beam along said one imaginary straight line and a second reflecting means having a planar reflecting surface arranged parallel with the other of said imaginary straight lines and obliquely to the said support for deflecting the fanned-out scanning beam along said other imaginary straight line. The reflecting surfaces of the first and second reflecting means may be so obliquely arranged with respect to said support that the fanned-out scanning beam is deflected through the light-transmitting region of the support at an angle of substantially 45° with respect to the support. Preferably said imaginary straight lines intersect substantially midway between the transverse edges of the support and each extends at an angle of substantially 45° with respect to the direction of displacement of articles over the light-transmitting region of the support.

According to one embodiment the deflecting means further comprises a third reflecting means for directing the fanned-out scanning beam from the fanning-out means onto the reflecting surface of said first reflecting means and a fourth reflecting means for directing the fanned-out scanning beam from the fanning-out means onto the reflecting surface of said second reflecting means. Preferably said first and third reflecting means and said second and fourth reflecting means respectively are located on opposite sides of the path of the scanning beam from said scanning beam producing means to said fanning-out means.

The light-transmitting region of the support preferably comprises two slits which coincide with said two imaginary straight lines and through which the scanning beam can pass. Such slits can be very narrow so that even small articles cannot fall therethrough, or at least no articles which, although small, are large enough to carry a code. If the scanning beam is deflected along two imaginary lines which intersect one another at about 90° in the support, and each of which preferably extends at about 45° to the direction of displacement of articles over said support, then corresponding intersecting slits may be provided in the support. Filling in the slits with a transparent material such as glass can accordingly be dispensed with. This eliminates the disadvantage which previously arose that glass surfaces become scratched and soiled and thus opaque.

Scattered light reflected from the code must be supplied to a photoelectric transducer, the output signals of which are further processed by evaluating means. The photoelectric transducer could be disposed above the support but would generally hamper the operator's work there. It is therefore preferred to utilze that portion of the scattered reflected light which travels back through the same optical devices which serve to direct the scanning beam onto the code. If this is done then it is only necessary to guide said portion of the scattered light from the fanning-out means through suitable focussing means onto the photoelectric transducer. As a result, a static beam is obtained which is guided onto the transducer. Accordingly only a small photo-receiving surface is needed and the use of a small and inexpensive photo-receiver is possible. In addition, small photo-receivers are particularly suitable for rapid mode operation. Since only reflected light from the scanned point falls on the photo-receiver and not the extraneous light from the whole region to be scanned, the proportion of extraneous light reaching the photo-receiver is small.

The fanning-out means may comprise a member which is rotatable or pivotable about an axis and which has at least one reflecting surface.

Said imaginary straight lines may be contained in a reading plane which is so inclined relative to a plane containing the fanned-out scanning beam before it is deflected that the path of the scanning beam from said scanning beam producing means to all parts of said imaginary straight lines is of substantially the same length. In one embodiment said reading plane is inclined at an angle of substantially 11° with respect to said plane containing the fanned-out scanning beam and the reflecting surfaces of said first and second reflecting means are inclined at an angle of substantially 60° with respect to said plane containing the fanned-out scanning beam. According to this embodiment, measured in said plane containing the fanned-out scanning beam, the mean deflection angle of the fanned-out scanning beam from the fanning-out means to each of said reflecting surfaces of said reflecting means is substantially 19° relative to the path of travel of the scanning beam to the fanning-out means and said reflecting surfaces of the reflecting means are each inclined at an angle of substantially 50° with respect to the path of travel of the scanning beam to the fanning-out means.

The scanning beam producing means may comprise a laser and a telescope for focussing the radiation from the laser.

Means may be provided between the scanning beam producing means and the fanning-out means for deflecting the scanning beam onto said fanning-out means.

Apparatus according to the present invention can be accommodated in a narrow space below the support for the coded articles. Thus room can be provided for the legs of an operator sitting by the support.

Examples of embodiments of the invention will not be particularly described with reference to the accompanying drawings, in which.

Figure 1:
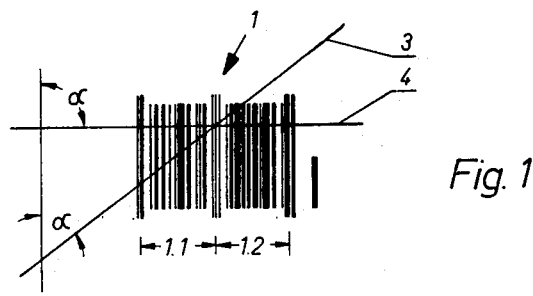
FIG. 1 shows a known bar code of the kind which can be applied to articles and read-off according to the invention.

FIG. 1 shows a code 1 which can be read according to the invention. It consists of two sections 1.1 and 1.2. During each read-out, it must be possible for at least one of the sections to be swept over completely by the scanning beam. This is always the case when the scanning angle $\alpha$ between the scanning device 3 or 4 and the longitudinal direction of the bars amounts to at least 45°. The next section is read correspondingly when the code is advanced.

Figure 2:
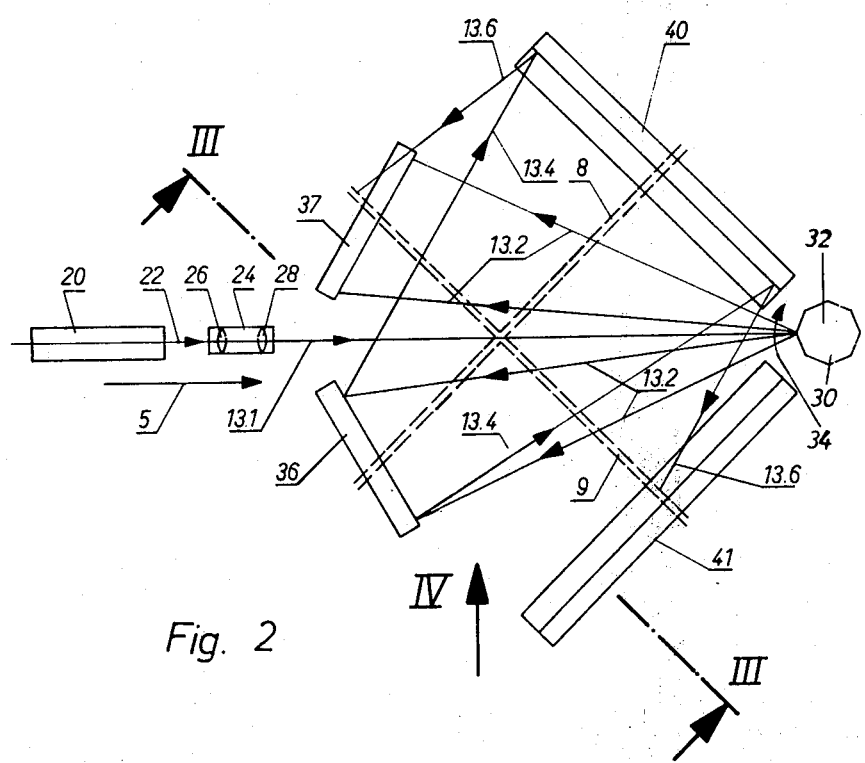
FIG. 2 shows, in plan view, apparatus according to a first embodiment of the invention, as it is disposed below a supporting plate for coded articles.
Figure 3:
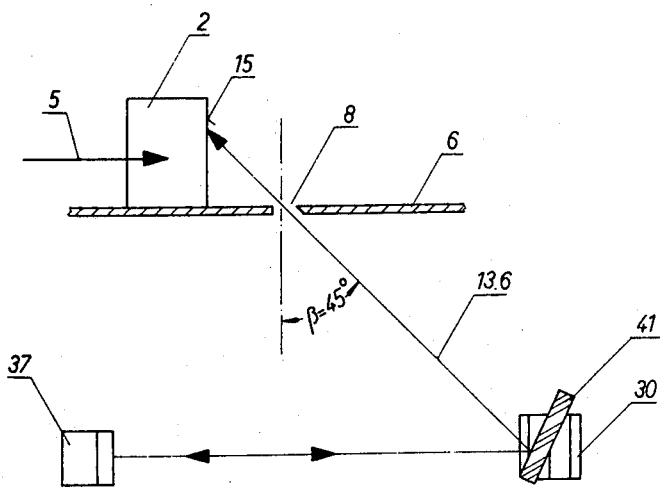
FIG. 3 is a vertical simplified section on lines III—III of FIG. 2.
Figure 4:
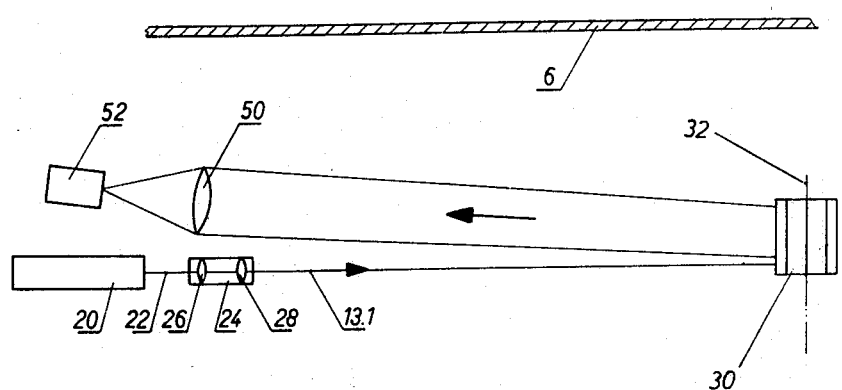
FIG. 4 is a side view of the apparatus seen in the direction of the arrow IV in FIG. 2, but with the mirrors omitted.

In operation, articles 2 (FIG. 3), distinguished by codes, are displaced in the direction of the arrow 5 over a supporting plate 6 which is illustrated in section in FIGS. 3 and 4 but is omitted in FIG. 2. In the support there are two slits 8, 9, which are indicated in broken lines in FIG. 2 although the supporting plate is not illustrated there. The slits extend at right angles to one another and each extend at 45° to the direction of movement 5 of the articles.

In the first place, a code which is on the lower face of an article can be read off in any case if it is displaced over the two slits 8 and 9 with substantially constant orientation, provided that a scanning beam extends upwards from below through the slits 8 and 9 and is displaced at adequate speed along the two slits in succession. As FIG. 3 shows, the scanning beam 13.6 is passed from below through the slit 8 at an angle $\beta$ of 45° to the vertical so that a code which is present on a vertical surface 15 of the articles 2 can be read off. The scanning beam 13.6 is displaced in a fan-like manner in a plane which extends perpendicular to the plane of the drawing in FIG. 3 and intersects the conveying plane of the support 6 in a straight track which extends along the slit 8. The same applies to the slit 9 which cannot be seen in FIG. 3.

The apparatus is constructed as follows:

A laser 20 produces a beam 22 which is passed through a telescope 24 in such a manner that it enters at the eyepiece 26 and emerges as the scanning beam 13.1 at the objective 28. Contrary to conventional use, therefore, the telescope is traversed in the reverse direction. Although the diameter of the beam is enlarged as a result, nevertheless the "angle of vision" is reduced. Thus the angle at which some of the rays emerge from the laser in relation to its centre axis, is reduced. The scanning beam 13.1 leaving the telescope is focussed, by the objective 28, on a point which lies above the supporting plate 6, substantially in the middle of the range of height within which reading is to be effected. Since the scanning beam covers a long distance between the eyepiece and this region, a slender scanning beam of great depth of focus is obtained. This beam is hereinafter called the "scanning beam" for the sake of simplicity.

The scanning beam 13.1. falls on a revolving mirror 30 which has eight mirror surfaces for example and rotates at high speed about a vertical axis 32. While it travels through an arc substantially along the arrow 34, each mirror surface of the revolving mirror 30 produces a scanning beam fan, of which some rays 13.2 are illustrated. The fan falls in succession on two mirrors 36 and 37 which are disposed in the inclined position illustrated in relation to the scanning beam 13.1 but otherwise vertically, while the axis of rotation 32 likewise extends vertically and the scanning beam 13.1 horizontally. A scanning-beam fan 13.4 is thrown by the mirror 36 onto a mirror 40 and by the mirror 37 onto a mirror 41 (FIG. 2). The mirrors 40 and 41 are orientated parallel to the slits 9 and 8 respectively but are inclined in relation to the vertical (FIGS. 2 and 3), so that a scanning-beam fan 13.6 reflected by them extends at 45° to the vertical or horizontal.

The following is achieved by this arrangement:

A scanning beam which is at first guided in the form of a fan via the mirror 36 by a mirror element of the revolving mirror 32 is guided by this mirror 36 in the form of a fan via the mirror 40 and by this in the form of a fan along the slit 9. On the further rotation of the same mirror element, and after a short interruption corresponding to the spacing between the mirrors 36 and 37, a fan is thrown onto the mirror 37, from this onto the mirror 41 and from this through the slit 8. Thus one and the same scanning beam is caused to travel successively through both slits. The cycle then begins afresh with the next mirror element of the revolving mirror 30 at the mirror 36.

Scattered light is produced from the scanning beam 13.6 on the article to be scanned, particularly, of course, on the code, and is radiated in all directions. Some of it passes back through the slit 8 or 9, via the mirror 41 and 37 or 40 and 36 to the revolving mirror 30. This scattered light is thrown by the revolving mirror through a lens 50 (FIG. 4) onto a relatively small light-receiving surface of a photoelectric transducer 52, for example a photodiode. The output signals of the transducer 52 are supplied to an electronic evaluating device which delivers signals corresponding to the code read off.

As FIGS. 3 and 4 show in particular, the whole device can be accommodated in a narrow space below the supporting plate 6 so that room is left for the legs of a seated operator, below the device.

The slits 8, 9 need not be filled in with transparent material, for example glass, so allowing dirt to fall downwards therethrough. The mirrors should then be mounted so that they are not directly beneath the slits. One or more collecting trays for the dirt may be disposed below the slits which can be cleaned, e.g., pneumatically, from time to time. These features are not illustrated in the drawing.

A pivoted mirror could be used instead of the revolving mirror 30. Pivoted prism surfaces or prism surfaces rotating about an axis could likewise be used instead.

The mirrors 36, 37, 40 and 41 could also be replaced by prisms. Although laser light is preferred because of its high intensity, other powerful light sources could be used instead.

With regard to the form of embodiment shown in FIGS. 5 to 8:

A major field of application for code readers of this kind is the distribution of goods in retail trade. Here an operator must grasp the goods 2 arriving in a conveyor trough 6 (FIG. 5) or on a conveyor belt and guide them over the light-transmitting region thereof, for example in the form of a cross slit 8, 9, so that at least one code provided on each article can be read. The most appropriate method of placing an operator 7 is at the end of the conveyor trough 6 so that he can grasp the goods 2, draw them over the cross slit and then place them in a bag 55 present in front of him. In order to render it possible to place the operator 57 at the end of the conveyor trough 6, the distance from the cross slit 8, 9 to the end 58 of the conveyor trough 6 must be kept as short as possible. In addition, for reasons of safety, care must be taken to ensure that the scanning beam, a laser beam in practice, does not normally impinge on the operator's head.

These requirements cannot be met by the code reader as shown in FIGS. 2 to 4 because the fanning-out device, for example the revolving mirror 30, takes up a certain amount of room. In practice, it must have a diameter of 10 cm or more.

Figure 6:
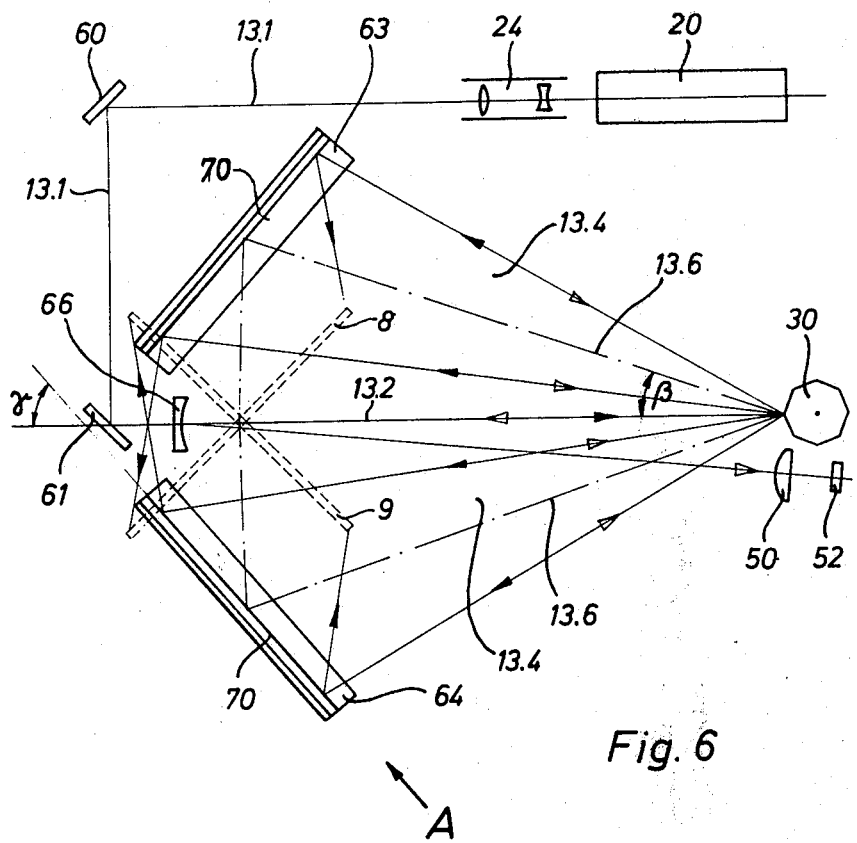
FIG. 6 is a diagrammatic plan view of the essential parts of a code reader in accordance with a second embodiment of the invention, the cross slit which is in a support above the code reader being drawn in broken lines.
Figure 7:
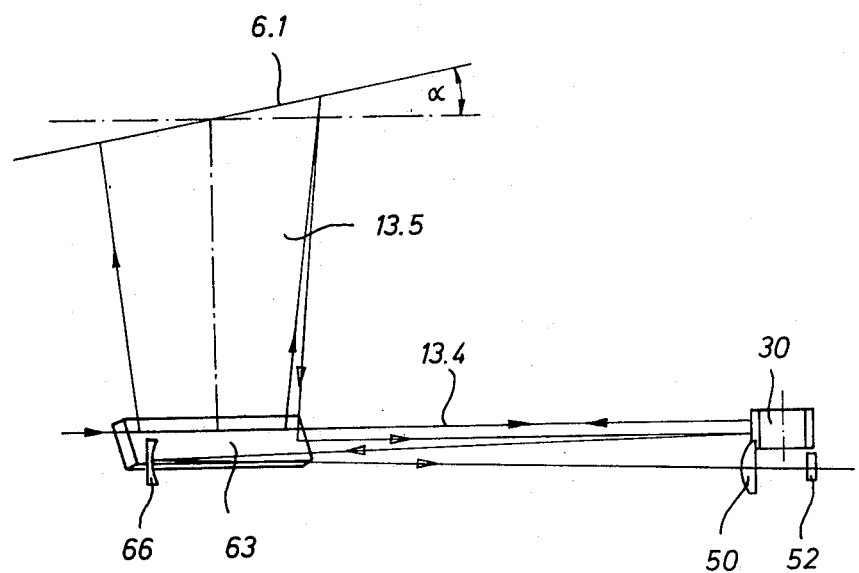
FIG. 7 shows, in a vertical section through the code reader of FIG. 6, the path of rays from the fanning-out device via a mirror surface to the cross slit.
Figure 8:
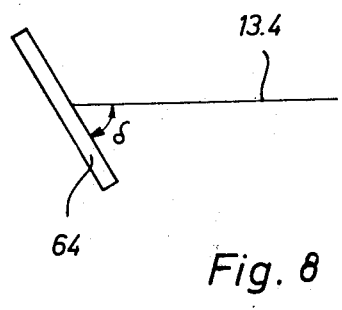
FIG. 8 is a side view of the mirror 64 in the direction of the arrow A in FIG. 6 and shows the oblique position of this mirror in relation to the fan plane.

The above-mentioned conditions are, however, fulfilled by the form of embodiment as shown in FIGS. 6 to 8.

According to FIG. 2, two mirror surfaces, for example 36–40 were provided one behind the other in the path of rays between the fanning-out device and the light-transmitting region of the support (hereinafter called the "cross slit" for the sake of simplicity). According to FIG. 6, however, only one mirror surface, for example the mirror 64, is necessary, as a result of which the expenditure on construction, adjustment work and space requirements are reduced.

In addition, however, the effect is achieved that, in the region of the cross slit, the support extends inclined to a fan plane originating from the fanning-out device. In general, the fan plane will extend parallel to the bottom plane of the apparatus. If the whole device is installed horizontally, an inclined position of the part of the support containing the cross slit, namely the reading plane, results and this reading plane drops away in the direction of conveying, that is to say towards the operator positioned at the end of the conveyor trough 6. This facilitates his work because gravity assists in the conveying of the goods towards the bag 55.

Difficulties are involved in determining the optimum angles between the reading plane, fan plane, mirror planes, etc., by purely mathematical means. A set of suitable angles was accordingly determined by experimental means.

Figure 5:
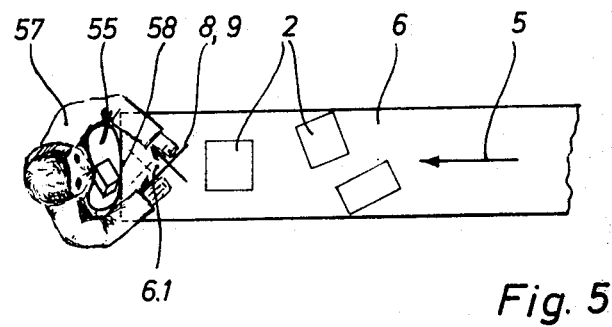
FIG. 5 is a plan view of a conveyor trough and an operator bagging goods.

A helium-neon laser 20 serves as a radiation source (FIG. 6), and a telescope 24 is provided for focussing the scanning beam as in the previous embodiment. The scanning beam 13.1 is then deflected via two mirrors 60 and 61 and directed along the straight centre line 13.2 towards the revolving mirror 30. The scanning beam is fanned-out by the revolving mirror 30 in the fan plane 13.4 and guided successively via two mirrors 63 and 64 from whence the scanning beam is guided upwards through the slits 8 and 9 respectively. The two mirrors 63 and 64 are disposed symmetrically in relation to the straight centre line 13.2 in such a manner that the fans 13.5 reflected upwards (FIG. 7) penetrate centrally into the reading plane 6.1, producing two scanning tracks which intersect one another at 90°. Each scanning track extends at 45° to the conveying direction 5 (FIG. 5). The reading plane 6.1 contains the cross slit 8, 9 in which the scanning tracks fall and is inclined at an angle $\alpha$ of about 11° to the fan plane 13.4 or to a parallel to the fan plane. The light reflected diffusely from a code displaced over the cross slit 8, 9 is reflected back, via the mirrors 63, 64 and the revolving mirror 30, onto a concave mirror 66 which, together with a collecting lens, focusses it on a small point, namely on the receiving surface of a silicon diode 52 serving as a photo-receiver.

The mean angle of deflection $\beta$ of the two fans extending from the revolving mirror 30 to the mirrors 63 and 64, that is to say the angle between the centre line 13.2 and the centre lines 13.6 of the fans amounts to about 19°. Likewise measured in the fan plane 13.4, the two mirrors 63 assume angles $\gamma$ each of about 50° to the centre line 13.2. The angle $\delta$ (FIG. 8) between the plane of the mirror 64 and the fane plane 13.4 amounts to about 60°. The same applies to the mirror 63.

FIG. 7 shows how the inclined position of the reading plane 6.1. comes about. The scanning beam should be focussed, from the telescope 24, in the manner described, on a point which lies in the plane of the cross slit 8, 9. Since the distance from the revolving mirror to the right-hand end of the mirror 63 in FIG. 7 is shorter than to the left-hand end, focussing of rays reflected from the right-hand end of the mirror is achieved later than those reflected from the left-hand end of the mirror, so resulting in the inclined position of the reading plane.

In FIG. 5 the cross slit 8, 9 is represented in full lines as it would have to be disposed according to the embodiment shown in FIG. 2, while its arrangement for the embodiment shown in FIGS. 6 to 8 is represented in broken lines, that is to say considerably closer to the end of the conveyor trough 6.

What is claimed is:

1. Apparatus for reading light-dark or colour-contrast codes on articles which are displaced over a light-transmitting region of a support for the articles of the kind wherein a scanning light beam is directed onto the articles and scattered light reflected from the articles and codes is supplied to a photoelectric transducer the output signal from which is supplied to electronic evaluating means, comprising:

means located beneath the support for producing a slender scanning beam of light, beam guiding means including means for fanning-out the scanning beam and means for deflecting the fanned-out scanning beam upwardly through the light-transmitting region of the support and displacing it along two imaginary straight lines located in the light-transmitting region of the support, said lines extending obliquely to the direction of displacement of the articles and substantially at right angles to one another, said deflecting means comprising first reflecting means having a planar reflecting surface arranged parallel with one of said imaginary straight lines and obliquely to the said support for deflecting the fanned-out scanning beam along said one imaginary straight line and a second reflecting means having a planar reflecting surface arranged parallel with the other of said imaginary straight lines and obliquely to the said support for deflecting the fanned-out scanning beam along said other imaginary straight line, said deflecting means further comprising a third reflecting means for directing the fanned-out scanning beam from the fanning-out means onto the reflecting surface of said first reflecting means and a fourth reflecting means for directing the fanned-out scanning beam from the fanning-out means onto the reflecting surface of said second reflecting means.

2. Apparatus according to claim 1 wherein the scanning beam producing means is constructed to produce a single scanning beam.

3. Apparatus according to claim 1 wherein the fanning-out means comprises a member which is rotatable or pivotable about an axis and which has at least one reflecting surface.

4. Apparatus according to claim 1, wherein the means for guiding said scanning upwardly through the light-transmitting region of the support and displacing it along said two imaginary straight lines is adapted to displace the fanned-out scanning beam along two imaginary straight lines which intersect.

5. Apparatus according to claim 4, wherein said imaginary straight lines intersect substantially midway between the transverse edges of the support and each extends at an angle of substantially 45° with respect to the direction of displacement of articles over the light-transmitting region of the support.

6. Apparatus according to claim 1, wherein said reflecting surface of the first and second reflecting means are so obliquely arranged with respect to said support that the fanned-out scanning beam is deflected through the light-transmitting region of the support at an angle of substantially 45° with respect to the support.

7. Apparatus according to claim 1, wherein said first and third reflecting means and said second and fourth reflecting means respectively are located on opposite sides of the path of the scanning beam from said scanning beam producing means to said fanning-out means.

8. Apparatus according to claim 1, wherein the light-transmitting region of the support comprises two slits which coincide with said two imaginary straight lines and through which the scanning beam can pass.

9. Apparatus according to claim 1 wherein the scanning beam producing means comprises a laser.

10. Apparatus according to claim 9, wherein the scanning beam producing means comprises a telescope for focussing the radiation from said laser.

11. Apparatus according to claim 9 wherein means is provided between the scanning beam producing means and the fanning-out means for deflecting the scanning beam onto said fanning-out means.

12. Apparatus for reading light-dark or colour-contrast codes on articles which are displaced over a light-transmitting region of a support for the articles of the kind wherein a scanning light beam is directed onto the articles and scattered light reflected from the articles and codes is supplied to a photoelectric transducer the output signal from which is supplied to electronic evaluating means, comprising:

means located beneath the support for producing a slender scanning beam of light, beam guiding means including means for fanning-out the scanning beam and means for deflecting the fanned-out scanning beam upwardly through the light-transmitting region of the support and displacing it along two imaginary straight lines located in the light-transmitting region of the support, said lines extending obliquely to the direction of displacement of the articles and substantially at right angles to one another, and means between said fanning-out means and said photoelectric transducer for focussing onto the photoelectric transducer scattered light reflected back from said articles and codes by way of said deflecting means and said fanning-out means when the apparatus is in use.

13. Apparatus according to claim 12 wherein the fanning-out means comprises a member which is rotatable or pivotable about an axis and which has at least one reflecting surface.

14. Apparatus for reading light-dark or colour-contrast codes on articles which are displaced over a light-transmitting region of a support for the articles of the kind wherein a scanning light beam is directed onto the articles and scattered light reflected from the articles and codes is supplied to a photoelectric transducer the output signal from which is supplied to electronic evaluating means, comprising:

means located beneath the support for producing a slender scanning beam of light, beam guiding means including means for fanning-out the scanning beam and means for deflecting the fanned-out scanning beam upwardly through the light-transmitting region of the support and displacing it along two imaginary straight lines located in the light-transmitting region of the support, said lines extending obliquely to the direction of displacement of the articles and substantially at right angles to one another, said deflecting means comprising first reflecting means having a planar reflecting surface arranged parallel with one of said imaginary straight lines and obliquely to the said support for deflecting the fanned-out scanning beam along said one imaginary straight line and a second reflecting means having a planar reflecting surface arranged parallel with the other of said imaginary straight lines and obliquely to the said support for deflecting the fanned-out scanning beam along said other imaginary straight line, said imaginary straight lines being contained in a reading plane which is so inclined relative to a plane containing the fanned-out scanning beam before it is deflected that the path of the scanning beam from said scanning beam producing means to all parts of said imaginary straight lines is of substantially the same length.

15. Apparatus according to claim 14, wherein said reading plane is inclined at an angle of substantially 11° with respect to said plane containing the fanned-out scanning beam and the reflecting surfaces of said first and second reflecting means are inclined at an angle of substantially 60° with respect to said plane containing the fanned out scanning beam, and wherein, measured in said plane containing the fanned-out scanning beam, the mean deflection angle of the fanned-out scanning beam from the fanning-out means to each of said reflecting surfaces of said reflecting means is substantially 19° relative to the path of travel of the scanning beam to the fanning-out means and said reflecting surfaces of the reflecting means are each inclined at an angle of substantially 50° with respect to the path of travel of the scanning beam to the fanning-out means.

16. Apparatus according to claim 14, wherein said reading plane is inclined at an angle of substantially 11° with respect to said plane containing the fanned-out scanning beam and the reflecting surfaces of said first and second reflecting means are inclined at an angle of substantially 60° with respect to said plane containing the fanned-out scanning beam.

17. Apparatus according to claim 14, wherein, measured in said plane containing the fanned-out scanning beam, the mean deflection angle of the fanned-out scanning beam from the fanning-out means to each of said reflecting surfaces of said reflecting means is substantially 19° relative to the path of travel of the scanning beam to the fanning-out means and said reflecting surfaces of the reflecting means are each inclined at an angle of substantially 50° with respect to the path of travel of the scanning beam to the fanning-out means.

* * * * *